US012794012B2

(12) United States Patent
Suganuma et al.

(10) Patent No.: US 12,794,012 B2
(45) Date of Patent: Nov. 10, 2026

(54) SULFIDE SOLID ELECTROLYTE AND SOLID STATE BATTERY

(71) Applicant: TOYOTA JIDOSHA KABUSHIKI KAISHA, Toyota (JP)

(72) Inventors: Hikaru Suganuma, Susono (JP); Keiichi Minami, Shizuoka-ken (JP); Masaki Watanabe, Susono (JP); Riyushin Yamanaka, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 692 days.

(21) Appl. No.: 18/212,735

(22) Filed: Jun. 22, 2023

(65) Prior Publication Data

US 2024/0014437 A1 Jan. 11, 2024

(30) Foreign Application Priority Data

Jul. 7, 2022 (JP) ................................ 2022-109588

(51) Int. Cl.

*H01M 10/0562* (2010.01)
*C01G 19/00* (2006.01)
*H01M 10/0585* (2010.01)

(52) U.S. Cl.

CPC ...... *H01M 10/0562* (2013.01); *C01G 19/006* (2013.01); *H01M 10/0585* (2013.01); *C01P 2002/70* (2013.01); *C01P 2002/86* (2013.01); *H01M 2300/0068* (2013.01)

(58) Field of Classification Search

CPC ......... H01M 10/0562; H01M 10/0585; H01M 2300/0068; H01M 4/62; H01M 10/052; H01M 10/0525; C01G 19/006; C01P 2002/70; C01P 2002/86; Y02E 60/10; C01B 17/22; C01B 25/088

See application file for complete search history.

(56) References Cited

U.S. PATENT DOCUMENTS

| | | | | |
|---|---|---|---|---|
| 10,388,985 | B2 * | 8/2019 | Kato | C01G 17/006 |
| 11,139,479 | B2 | 10/2021 | Chao et al. | |
| 2013/0040208 | A1 | 2/2013 | Kanno et al. | |
| 2015/0017548 | A1 | 1/2015 | Kato et al. | |
| 2023/0163348 | A1 | 5/2023 | Watanabe et al. | |

FOREIGN PATENT DOCUMENTS

| | | | |
|---|---|---|---|
| JP | 2021-150289 | A | 9/2021 |
| JP | 2023-076114 | A | 6/2023 |
| WO | 2011/118801 | A1 | 9/2011 |
| WO | 2013/118722 | A1 | 8/2013 |

* cited by examiner

*Primary Examiner* — Helen Oi K Conley
(74) *Attorney, Agent, or Firm* — Dinsmore & Shohl LLP

(57) ABSTRACT

A main object of the present disclosure is to provide a sulfide solid electrolyte with high ion conductivity. The present disclosure achieves the object by providing a sulfide solid electrolyte including a LGPS-type crystal phase containing a Li element, an M element, a P element, and a S element, wherein: the M element is at least one kind or more of an element selected from Sb, Si, Ge, Sn, B, Al, Ga, In, Ti, Zr, V, and Nb; and in a $^{31}$P-NMR measurement, when y (ppm) designates a half value width of a peak having an apex at a position of 77 ppm±1 ppm, and x (%) designates a rate of impurity phase measured, the sulfide solid electrolyte satisfies a below formula (1):

$$y \leq -0.0431x + 4.28 \quad (1).$$

6 Claims, 2 Drawing Sheets

SULFIDE SOLID ELECTROLYTE AND SOLID STATE BATTERY

CROSS-REFERENCE TO RELATED APPLICATIONS

This application is based upon and claims the benefit of priority of the prior Japanese Patent Application No. 2022-109588, filed on Jul. 7, 2022, the entire contents of which are incorporated herein by reference.

TECHNICAL FIELD

The present disclosure relates to a sulfide solid electrolyte and a solid state battery.

BACKGROUND ART

A solid state battery is a battery including a solid electrolyte layer between a cathode layer and an anode layer, and one of the aspects thereof is that the simplification of a safety device may be more easily achieved compared to a liquid-based battery including a liquid electrolyte sheet containing a flammable organic solvent. As a solid electrolyte used for a solid state battery, a sulfide solid electrolyte has been known.

Also, as a sulfide solid electrolyte, a sulfide solid electrolyte including so-called LGPS-type crystal phase has been known. For example, Patent Literature 1 discloses a sulfide solid electrolyte containing a $M_1$ element (such as Li), a $M_2$ element (such as Sn and P), and a S element, wherein the sulfide solid electrolyte has a peak in the specified position in an X-ray diffraction measurement. Also, Patent Literature 2 discloses a sulfide solid electrolyte including a LGPS-type crystal phase that contains $M_1$ element that is at least one kind selected from the group consisting of Li, Na, K, Mg, Ca, and Zn; $M_2$ element that is at least one kind selected from the group consisting of P, Sb, Si, Ge, Sn, B, Al, Ga, In, Ti, Zr, V, and Nb; and a S element.

CITATION LIST

Patent Literatures

Patent Literature 1: International Application Publication: WO 2013/118722

Patent Literature 2: International Application Publication: WO 2011/118801

SUMMARY OF DISCLOSURE

Technical Problem

From a viewpoint of improving performance of a solid state battery, a sulfide solid electrolyte with excellent ion conductivity has been required. The present disclosure has been made in view of the above circumstances, and a main object thereof is to provide a sulfide solid electrolyte with high ion conductivity.

Solution to Problem

[1]

A sulfide solid electrolyte comprising a LGPS-type crystal phase containing a Li element, an M element, a P element, and a S element, wherein: the sulfide solid electrolyte contains at least one kind or more of an element selected from Sb, Si, Ge, Sn, B, Al, Ga, In, Ti, Zr, V, and Nb, as the M element; and in a $^{31}$P-NMR measurement, when y (ppm) designates a half value width of a peak having an apex at a position of 77 ppm±1 ppm, and x (%) designates a rate of impurity phase, the sulfide solid electrolyte satisfies a below formula (1):

$$y \leq -0.0431x+ +4.28 \quad (1).$$

[2]

The sulfide solid electrolyte according [1], wherein the sulfide solid electrolyte further satisfies a below formula (2):

$$y \leq -0.0489x+4.09 \quad (2).$$

[3]

The sulfide solid electrolyte according to [1] or [2], wherein the sulfide solid electrolyte further satisfies a below formula (3):

$$y \leq -0.156x+4.57 \quad (3).$$

[4]

The sulfide solid electrolyte according to any one of [1] to [3], wherein the sulfide solid electrolyte further satisfies a below formula (4):

$$y \leq -0.0043x+3.30 \quad (4).$$

[5]

The sulfide solid electrolyte according to any one of [1] to [4], wherein the x is 10 or more.

[6]

The sulfide solid electrolyte according to any one of [1] to [5], wherein the sulfide solid electrolyte has a composition represented by $Li_{4-\alpha}M_{1-\alpha}P_{\alpha}S_4$, provided that $0.55 \leq \alpha \leq 0.76$.

[7]

The sulfide solid electrolyte according to any one of [1] to [6], wherein the sulfide solid electrolyte contains at least a Sn element as the M element.

[8]

The sulfide solid electrolyte according to any one of [1] to [7], wherein an ion conductivity of the sulfide solid electrolyte at 25 °C is 5.0 mS/cm or more.

[9]

A solid state battery comprising a cathode layer containing a cathode active material, an anode layer containing an anode active material, and a solid electrolyte layer arranged between the cathode layer and the anode layer, wherein: at least one of the cathode layer, the anode layer, and the solid electrolyte layer contains the sulfide solid electrolyte according to any one of [1] to [8].

Effects of Disclosure

The present disclosure exhibits an effect of providing a sulfide solid electrolyte with high ion conductivity.

DESCRIPTION OF EMBODIMENTS

Figure 1A:
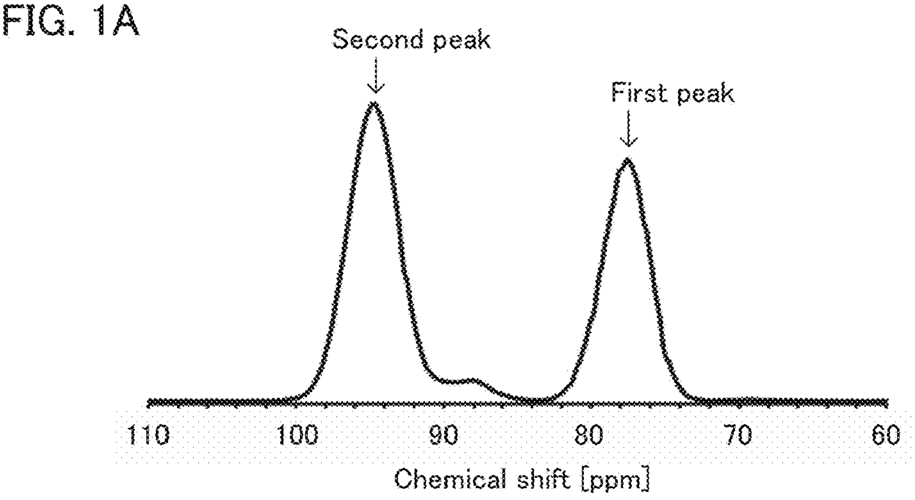
FIG. 1A is an explanatory diagram explaining the peak separation of the NMR chart in the present disclosure.

The sulfide solid electrolyte and the solid state battery in the present disclosure will be hereinafter explained in details.

A. Sulfide Solid Electrolyte

The sulfide solid electrolyte in the present disclosure is a sulfide solid electrolyte including a LGPS-type crystal phase containing a Li element, an M element, a P element, and a S element, wherein: the M element is at least one kind or more of an element selected from Sb, Si, Ge, Sn, B, Al, Ga, In, Ti, Zr, V, and Nb; and in a $^{31}$P-NMR measurement, when y (ppm) designates a half value width of a peak having an apex at a position of 77 ppm±1 ppm, and x (%) designates a rate of impurity phase measured, the sulfide solid electrolyte satisfies a below formula (1):

$$y \leq -0.0431x + 4.28 \quad (1).$$

According to the present disclosure, the specified half value width and the rate of impurity phase satisfying the specified formula allow the sulfide solid electrolyte to have high ion conductivity.

As described above, a sulfide solid electrolyte including a LGPS-type crystal phase has been known. Meanwhile, the inventors of the present disclosure have obtained a knowledge that, when the ion conductivity of sulfide solid electrolytes including a LGPS-type crystal phase was measured, the ion conductivity varied in the compositions considered to have excellent ion conductivity. The inventors of the present disclosure further analyzed the properties of the sulfide solid electrolyte in details and found out that the relation between the half value width of the specified peak (peak of 2b site) and the rate of impurity phase, in a $^{31}$P-NMR measurement, gave influence to the ion conductivity.

Here, it is presumed that, since the LGPS-type crystal phase has high ion conductivity, the larger the rate of impurity phase is, the lower the ion conductivity becomes, and it is presumed that the smaller the rate of impurity phase is, the higher the ion conductivity becomes. However, as shown in Examples to be descried later, surprisingly, it has been found out that, even when the rate of impurity phase is large, when the half value width of the peak in 2b site is in the specified range, the ion conductivity is excellent, and even when the rate of impurity phase is small, when the half value width of the peak in 2b site is not in the specified range, sufficient ion conductivity is not obtained.

The mechanism of the half value width of the peak in 2b site and the rate of impurity phase giving influence to the ion conductivity is not clear, but it is presumed as follows. As described later, the LGPS-type crystal phase includes a 4d site configuring a one-dimensional chain that is a main chain, and a 2b site that connects neighboring one-dimensional chains. Then, the size of the half value width of the peak in the 2b site, that is, the degree of the crystallinity is considered to contribute to the stability of the main chain and the stability of the crystal structure. For this reason, even when the rate of impurity phase is large, when the main chain and the crystal structure are stable, it is considered to show excellent ion conductivity.

In a $^{31}$P-NMR measurement, when y (ppm) designates a half value width of a peak having an apex at a position of 77 ppm±1 ppm, and x (%) designates a rate of impurity phase, the sulfide solid electrolyte in the present disclosure satisfies a below formula (1). The below formula (1) is, in FIG. 4 described later, obtained as a formula of a straight line connecting the results of Example 11 and Example 12.

$$y \leq -0.0431x + 4.28 \quad (1)$$

In some embodiments, the sulfide solid electrolyte in the present disclosure further satisfies a below formula (2). The below formula (2) is, in FIG. 4 described later, obtained as a formula of a straight line connecting the results of Example 1 and Example 3.

$$y \leq -0.0489x + 4.09 \quad (2)$$

In some embodiments, the sulfide solid electrolyte in the present disclosure further satisfies a below formula (3). The below formula (3) is, in FIG. 4 described later, obtained as a formula of a straight line connecting the results of Example 1 and Example 4.

$$y \leq -0.156x + 4.57 \quad (3)$$

Also, the sulfide solid electrolyte in the present disclosure may further satisfy a below formula (4). The below formula (4) is, in FIG. 4 described later, obtained as a formula of a straight line connecting Example 3 and Example 4.

$$y \leq -0.0043x + 3.30 \quad (4)$$

The rate x (%) of impurity phase is not particularly limited as long as it is a value satisfying the above formula (1). The x is, for example, 40% or less, may be 30% or less, may be 25% or less, and may be 20% or less. Meanwhile, the x may be 0% and may be larger than 0%. In the latter case, the x is, for example, 5% or more and may be 10% or more. How to obtain the rate (x) of impurity phase will be described later. Also, the rate x of impurity phase can be adjusted by changing the production conditions such as weighing table revolving number and heating temperature in the mechanical milling to be described later.

The half value width y (ppm) is not particularly limited as long as it is a value satisfying the above formula (1). The y is usually 4.28 ppm or less, may be 4.09 ppm or less, may be 3.80 ppm or less, may be 3.60 ppm or less, and may be 3.30 ppm or less. Meanwhile, the y is, for example, 2.00 ppm or more, may be 2.50 ppm or more, and may be 3.00 ppm or more. Also, the half value width y can be adjusted by changing the production conditions such as weighing table revolving number and heating temperature in the mechanical milling to be described later.

Figure 1B:
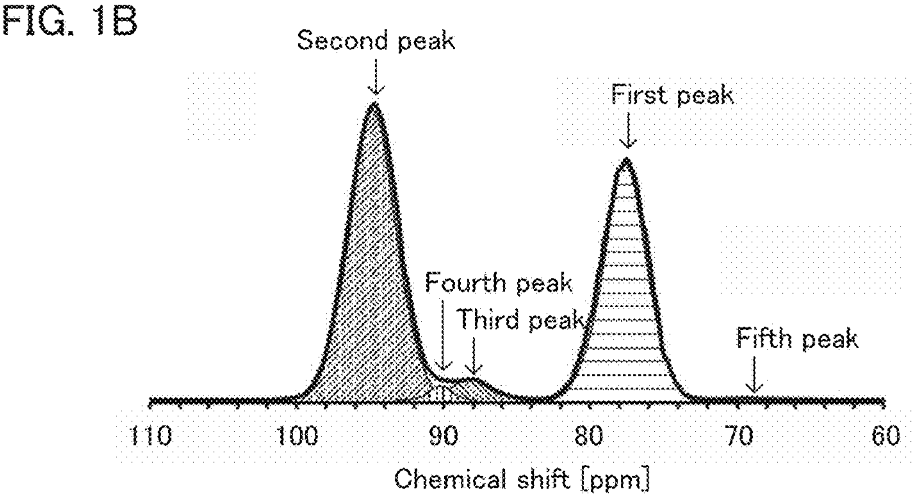
FIG. 1B is an explanatory diagram explaining the peak separation of the NMR chart in the present disclosure.

The rate (x) of impurity phase and the half value width (y) in the present disclosure will be explained. In the present disclosure, peak separation is performed to the NMR chart obtained in the $^{31}$P-NMR measurement. On this occasion, fitting is performed to minimize the accidental error. FIGS. 1A and 1B are explanatory diagrams explaining the peak separation of the NMR chart in the present disclosure. For example, the NMR chart as shown in FIG. 1A is obtained by performing a $^{31}$P-NMR measurement to the sulfide solid electrolyte in the present disclosure. In FIG. 1A, the first peak and second peak are observed as large peaks. Further, when the peak separation is performed to the NMR chart shown in FIG. 1A, each peak is identified as shown in FIG. 1B.

The first peak is a peak having an apex at a position of 77 ppm±1 ppm, and is a peak ascribed to a phosphorus atom that occupies the 2b site inside of the crystal structure. Also, the second peak is a peak having an apex at a position of 93 ppm±1 ppm, and is a peak ascribed to a phosphorus atom that occupies the 4d site inside of the crystal structure. Both of the first peak and the second peak are the peaks ascribed to the LGPS crystal phase.

Also, the third peak, the fourth peak and the fifth peak are the peaks of impurity phase. In specific, the third peak and the fourth peak are the peaks ascribed to $Li_3PS_4$, and the fifth peak is a peak ascribed to P—S—O. Incidentally, the peaks of impurity phase include, for example, not only a peak of crystal phase, but also a peak of amorphous phase.

Here, when Si designates a total area of all peaks obtained in the $^{31}$P-NMR measurement, and $S_2$ designates a total area of the first peak and the second peak, the rate x (%) of the impurity phase is obtained as $(S_1-S_2)/S_1$.

Also, the half value width y of the peak having an apex at a position of 77 ppm±1 ppm, is a half value width (full width at half maximum) of the above described first peak (peak of the 2b site). It can be judged that the smaller the half value width y is, the higher the crystallinity in the 2b site becomes.

The sulfide solid electrolyte in the present disclosure comprises a LGPS-type crystal phase containing a Li element, an M element, a P element, and a S element. The sulfide solid electrolyte contains at least one kind or more of an element selected from Sb, Si, Ge, Sn, B, Al, Ga, In, Ti, Zr, V, and Nb, as the M element. The M element may be an element of one kind, and may be an element of two kinds or more, but in some embodiments is at least a Sn element.

Figure 2:
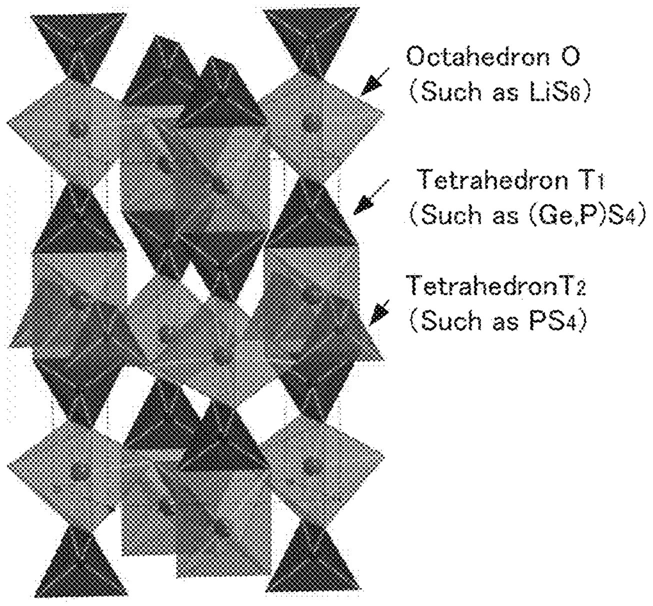
FIG. 2 is a perspective view exemplifying the structure of a LGPS-type crystal phase in the present disclosure.

FIG. 2 is a schematic perspective view exemplifying the structure of the LGPS-type crystal phase in the present disclosure. The LGPS-type crystal phase shown in FIG. 2 has one-dimensional chains in which the tetrahedron $T_1$ and the octahedron O share a common edge and are one-dimensionally connected, and has a three-dimensional structure in which adjacent one-dimensional chains are linked through tetrahedron $T_2$.

Examples of the tetrahedron $T_1$ may include $MS_4$ such as $GeS_4$ and $SiS_4$; and $PS_4$. Also, examples of the octahedron O may include $LiS_6$. Examples of the tetrahedron $T_2$ may include $PS_4$. It has been known that there are two sites in the sites (positions) occupied by phosphorus atom in the LGPS-type crystal phase; the two sites are the 4d site configuring the one-dimensional chain, and the 2b site linking the one-dimensional chains.

Whether the sulfide solid electrolyte includes a LGPS-type crystal phase or not can be confirmed by, for example, an X-ray diffraction measurement (XRD measurement) using a CuKα ray. In the LGPS-type crystal phase, peaks may be observed in the specific positions in an X-ray diffraction measurement using a CuKα ray. Examples of the peak positions of the LGPS-type crystal phase may include, 2θ=17.38°, 20.18°, 20.44°, 23.56°, 23.96°, 24.93°, 26.96°, 29.07°, 29.58°, 31.71°, 32.66°, and 33.39°. In particular, the LGPS-type crystal phase includes characteristic peaks in the positions of 2θ=20.18°, 20.44°, 26.96°, and 29.58°. Also, the peak positions may be slightly shifted when a crystal lattice slightly changes due to factors such as a material composition. For this reason, each of these peak positions may shift in the range of ±0.50°, may shift in the range of ±0.30°, and may shift in the range of ±0.10°.

Also, the sulfide solid electrolyte in the present disclosure may be a single phase material of the LGPS-type crystal phase, and may be a mixed phase material including a crystal phase other than the LGPS-type crystal phase. In the latter case, in some embodiments, the sulfide solid electrolyte in the present disclosure includes the LGPS-type crystal phase as a main phase. "Main phase" refers to a crystal phase to which the peak with the highest diffraction intensity is ascribed to in an XRD measurement. The proportion of the LGPS-type crystal phase with respect to all the crystal phases included in the sulfide solid electrolyte is, for example, 50 weight % or more, may be 70 weight % or more, and may be 90 weight % or more.

The sulfide solid electrolyte in the present disclosure may have a composition represented by $Li_{4-\alpha}M_{1-\alpha}P_{\alpha}S_4$, provided that $0.55\leq\alpha\leq0.76$. The M is the same as the M element described above. The α is 0.55 or more, may be 0.60 or more, may be 0.65 or more, and may be 0.67 or more. Meanwhile, the α is 0.76 or less, may be 0.73 or less, may be 0.72 or less, and may be 0.70 or less.

Also, the sulfide solid electrolyte in the present disclosure may have a composition represented by $Li_{4-\alpha}(M^1{}_{1-\beta}M^2{}_{\beta})_{1-\alpha}P_{\alpha}S_4$, provided that $0.55\leq\alpha\leq0.76$ and $0.2\leq\beta\leq1.0$. The $M^1$ and the $M^2$ are the same as the M element described above, and each of them are different kind of elements. In particular, in some embodiments, the $M^1$ is Sn and the $M^2$ is Si. The α is in the same contents as those described above. The β may be 0 and may be larger than 0. In the latter case, the β is, for example, 0.2 or more and may be 0.5 or more. Also, the β may be 1 and may be smaller than 1. In the latter case, the β is, for example, 0.9 or less and may be 0.8 or less.

The Li ion conductivity of the sulfide solid electrolyte in some embodiments is high. The ion conductivity of the sulfide solid electrolyte at 25 °C is, for example, 4.8 mS/cm or more, 5.0 mS/cm or more, and may be 5.2 mS/cm or more. The ion conductivity may be obtained by A.C. impedance method. Also, examples of the shape of the sulfide solid electrolyte may include a granular shape. The average particle size ($D_{50}$) of the sulfide solid electrolyte is, for example, 0.1 μm or more and 50 μm or less. Incidentally, the average particle size ($D_{50}$) refers to a particle size of 50% accumulation in a volume-based particle size distribution by a laser diffraction particle distribution measurement device. Also, the sulfide solid electrolyte may be used for arbitrary applications requiring the ion conductivity. In some embodiments, the sulfide solid electrolyte is used for a solid state battery.

The method for producing the sulfide solid electrolyte in the present disclosure is not particularly limited if the above described sulfide solid electrolyte can be obtained by the method.

For example, in the production of the sulfide solid electrolyte in the present disclosure, first, raw materials are mixed to prepare a raw material composition. Examples of the raw materials may include $Li_2S$, $P_2S_5$, $SiS_2$, and $SnS_2$.

Next, the raw material composition is amorphized to obtain an ion conductive material. The method for amorphizing the raw material composition is not particularly limited, and examples thereof may include a mechanical milling method and melting and quenching method. The weighing table revolving number in the mechanical milling is, for example, 250 rpm or more and 350 rpm or less. The mechanical milling time is, for example, 5 hours or more and 50 hours or less.

Next, the obtained ion conductive material is heated in an inert gas flow. Thereby, a sulfide solid electrolyte is obtained. Examples of the inert gas may include a noble gas such as argon and helium. Also, the heating method is appropriately set so as to obtain the desired sulfide solid electrolyte. The heating temperature is, for example, 520 °C or more and 600 °C or less.

B. Solid State Battery

Figure 3:
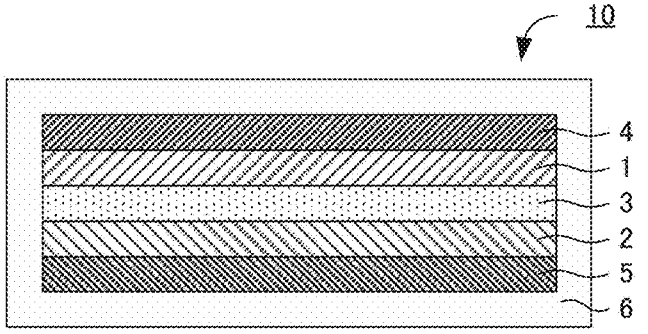
FIG. 3 is a schematic cross-sectional view exemplifying the solid state battery in the present disclosure.

FIG. 3 is a schematic cross-sectional view exemplifying the solid state battery in the present disclosure. Solid state battery 10 in FIG. 3 includes cathode layer 1 containing a cathode active material, anode layer 2 containing an anode active material, solid electrolyte layer 3 arranged between the cathode layer 1 and the anode layer 2, cathode current collector 4 for collecting currents of the cathode layer 1, anode current collector 5 for collecting currents of the anode layer 2, and outer package 6 for storing these members. In the present disclosure, at least one of the cathode layer 1, the anode layer 2, and the solid electrolyte layer 3 contains the sulfide solid electrolyte described in "A. Sulfide solid electrolyte" above.

According to the present disclosure, the above described sulfide solid electrolyte is used, and thus a solid state battery with excellent discharge properties may be achieved.

1. Cathode Layer

The cathode layer in the present disclosure contains at least a cathode active material. The cathode layer may contain at least one of a solid electrolyte, a conductive material, and a binder. In some embodiments, the cathode layer contains the above described sulfide solid electrolyte as the solid electrolyte. The proportion of the sulfide solid electrolyte in the cathode layer is, for example, 5 volume % or more, may be 10 volume % or more, and may be 20 volume % or more. Meanwhile, the proportion of the sulfide solid electrolyte in the cathode layer is, for example, 60 volume % or less.

Examples of the cathode active material may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, $Li_4Ti_5O_{12}$, and $Li(Ni_{0.5}Mn_{1.5})O_4$; and an olivine type active material such as $LiFePO_4$, $LiMnPO_4$, $LiNiPO_4$, and $LiCoPO_4$. The surface of the cathode active material may be coated with a Li-ion conductive oxide such as $LiNbO_3$. The thickness of the Li-ion conductive oxide is, for example, 1 nm or more and 30 nm or less.

Examples of the conductive material may include a particulate carbon material such as acetylene black (AB) and Ketjen black (KB); and a fiber carbon material such as carbon fiber, carbon fiber nanotube (CNT), and carbon nanofiber (CNF). Examples of the binder may include a fluorine-based binder such as polyvinylidene fluoride (PVDF). The thickness of the cathode layer is, for example, 0.1 μm or more and 1000 μm or less.

2. Anode Layer

The anode layer in the present disclosure contains at least an anode active material. The anode layer may contain at least one of a solid electrolyte, a conductive material, and a binder. In some embodiments, the anode layer contains the above described sulfide solid electrolyte as the solid electrolyte. The proportion of the sulfide solid electrolyte in the anode layer is, for example, 5 volume % or more, may be 10 volume % or more, and may be 20 volume % or more. Meanwhile, the proportion of the sulfide solid electrolyte in the anode layer is, for example, 60 volume % or less.

Examples of the anode active material may include a Li-based active material such as a metal lithium and a lithium alloy; a carbon-based active material such as graphite and hard carbon; an oxide-based active material such as lithium titanate; and a Si-based active material such as a simple substance of Si, a Si alloy and a silicon oxide. Also, the conductive material and the binder to be used in the anode layer are the same as the materials used in the cathode layer described above. The thickness of the anode layer is, for example, 0.1 μm or more and 1000 μm or less.

3. Solid Electrolyte Layer

The electrolyte layer in the present disclosure is arranged between the cathode layer and the anode layer, and contains a solid electrolyte. In some embodiments, the solid electrolyte layer contains the above described sulfide solid electrolyte. The proportion of the sulfide solid electrolyte in the solid electrolyte layer is, for example, 50 volume % or more, may be 70 volume % or more, and may be 90 volume % or more. The solid electrolyte layer may contain a binder. The thickness of the solid electrolyte layer is, for example, 0.1 μm or more and 1000 μm or less.

4. Solid State Battery

The solid state battery in the present disclosure may include a cathode current collector and an anode current collector. Examples of the material for the cathode current collector may include SUS, aluminum, nickel, iron, titanium, and carbon. Meanwhile, examples of the material for the anode current collector may include SUS, copper, nickel, and carbon. Examples of the outer package may include a laminate type outer package and a case type outer package.

The solid state battery in the present disclosure is typically a lithium ion secondary battery. Also, the solid state battery in the present disclosure may be so-called all solid state battery. The application of the solid state battery is not particularly limited, and examples thereof may include a power source for vehicles such as hybrid electric vehicles (HEV), plug-in hybrid electric vehicles (PHEV), battery electric vehicles (BEV), gasoline-fueled automobiles and diesel powered automobiles. In some embodiments, it is used as a power source for driving hybrid electric vehicles, plug-in hybrid electric vehicles, or battery electric vehicles. Also, the battery in the present disclosure may be used as a power source for moving bodies other than vehicles (such as rail road transportation, vessel and airplane), and may be used as a power source for electronic products such as information processing equipment.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

In Examples and Comparative Examples below, all operations were performed in a manner such that materials did not contact atmospheric air so as to prevent oxidation and deterioration of the materials.

Example 1

As starting materials, a lithium sulfide ($Li_2S$, from Nippon Chemical Industrial Co., Ltd.), phosphorous pentasulfide ($P_2S_5$, from Aldrich), and a tin sulfide ($SnS_2$, from Kojundo Chemical Laboratory Co., Ltd.) were used. Powder of these were weighed so as to be the composition shown in Table 1, in a glove box under an argon atmosphere, and mixed by an agate mortar. Thereby, a raw material composition was obtained.

Next, the obtained raw material composition and crushing balls (zirconium balls) were projected into a container (zirconium pot) in a glove box under an argon atmosphere, and the container was sealed. On this occasion, the volume of the crushing balls added was adjusted to approximately 1/6 of the volume of the container, and the weight of the raw material composition added was adjusted to approximately 1/50 of the weight of the crushing balls. This container was installed to a planetary ball milling machine (P7 from Fritsch), and mechanical milling (revolution speed: 300 rpm) was conducted for 20 hours. Thereby, an ion conductive material was obtained.

Next, the obtained ion conductive material was arranged on a graphite board, and heated in an Ar gas flow. The heating conditions were as follows. That was, the temperature was raised from the room temperature to 570 °C in 10 hours, 570 °C was maintained for 6 hours, and then cooled to the room temperature. Thereby, the sulfide solid electrolyte with a composition represented by $Li_{3.33}Sn_{0.33}P_{0.67}S_4$ was obtained.

Examples 2 to 13

A sulfide solid electrolyte was respectively obtained in the same manner as in Example 1, except that the composition of the raw material composition was changed to the contents shown in Table 1. As a Si source, silicon sulfide ($SiS_2$) was used. Also, the rate of impurity phase and the half value width were adjusted by changing the weighing table revolving number of the planetary ball milling machine and the heating temperature.

Comparative Examples 1 to 9

A sulfide solid electrolyte was respectively obtained in the same manner as in Example 1, except that the composition of the raw material composition was changed to the contents shown in Table 2. As a Si source, silicon sulfide ($SiS_2$) was used. Also, the rate of impurity phase and the half value width were adjusted by changing the weighing table revolving number of the planetary ball milling machine and the heating temperature.

Evaluation

<X-Ray Diffraction Measurement>

An X-ray diffraction (XRD) measurement was respectively conducted to the sulfide solid electrolytes obtained in Examples 1 to 13 and Comparative Examples 1 to 9. The XRD measurement was conducted to the powder sample in the conditions of, under inert atmosphere and usage of a CuKα ray. As a result, it was confirmed that all the sulfide solid electrolytes obtained in Examples 1 to 13 and Comparative Examples 1 to 9 had the LGPS-type crystal phase.

<$^{31}$P-NMR Measurement>

The $^{31}$P-NMR measurement was respectively conducted to the sulfide solid state electrolytes obtained in Examples 1 to 13 and Comparative Examples 1 to 9. The $^{31}$P-NMR measurement was conducted in the following conditions.

Device: AVANCE400 from Bruker
Measurement method: single pulse method
Measurement nuclear frequency: 161.9810825 MHz ($^{31}$P nuclear)
Spectral width: 100.0 kHz
Pulse width: 1.5 μsec (45° pulse)
Pulse repeating time ACQTM: 0.0410150 sec, pd=3000 sec
Numbers of observation points: 8192
Reference substance: diammonium hydrogenphosphate (external reference: 1.33 ppm)
Room temperature: approximately 25 °C
Sample revolving number: 9.5, 15 kHz The results of the half value width y (ppm) of the peak in the 2b site, and the rate x (%) of impurity phase, obtained by the $^{31}$P-NMR measurement are shown in Table 1, Table 2, and FIG. 4.

<Ion Conductivity Measurement>

The ion conductivity of the sulfide solid electrolytes obtained in Examples 1 to 13 and Comparative Examples 1 to 9 was respectively measured. First, the sulfide solid electrolyte was weighted to be 200 mg, put in a cylinder made of macole, and pressed by the pressure of 4 ton/cm$^2$. Both ends of the obtained pellet was sandwiched by a pin made of SUS, and a restraining pressure was applied to the pellet by bolting. The ion conductivity was calculated by A.C. impedance method while the obtained sample was maintained at 25 °C. In the measurement, Solartron1260 was used, with the applied voltage of 5 mV and the measurement frequency range of 0.01 to 1 MHz. The results are shown in Table 1 and Table 2.

TABLE 1

| | α | Sn/Si | $Li_{4-\alpha}(Sn/Si)_{1-\alpha}P_\alpha S_4$ | Ion conductivity (mS/cm) | Impurity phase (%) | Half value width (ppm) |
|---|---|---|---|---|---|---|
| Example 1 | 0.67 | 10/0 | $Li_{3.33}Sn_{0.33}P_{0.67}S_4$ | 5.2 | 4.5 | 3.87 |
| Example 2 | 0.73 | 10/0 | $Li_{3.27}Sn_{0.27}P_{0.73}S_4$ | 5.4 | 3.8 | 3.55 |
| Example 3 | 0.76 | 8/2 | $Li_{3.24}(Sn/Si)_{0.24}P_{0.76}S_4$ | 5 | 17.8 | 3.22 |
| Example 4 | 0.75 | 8/2 | $Li_{3.25}(Sn/Si)_{0.25}P_{0.75}S_4$ | 5.2 | 8.4 | 3.26 |
| Example 5 | 0.72 | 8/2 | $Li_{3.28}(Sn/Si)_{0.28}P_{0.72}S_4$ | 5.4 | 8.2 | 3.3 |
| Example 6 | 0.72 | 5/5 | $Li_{3.28}(Sn/Si)_{0.28}P_{0.72}S_4$ | 5.4 | 17.4 | 3.17 |
| Example 7 | 0.7 | 5/5 | $Li_{3.3}(Sn/Si)_{0.3}P_{0.7}S_4$ | 5.4 | 4.8 | 3.79 |
| Example 8 | 0.7 | 2/8 | $Li_{3.3}(Sn/Si)_{0.3}P_{0.7}S_4$ | 5.8 | 4 | 3.58 |
| Example 9 | 0.7 | 8/2 | $Li_{3.3}(Sn/Si)_{0.3}P_{0.7}S_4$ | 5.4 | 4.9 | 3.6 |
| Example 10 | 0.67 | 5/5 | $Li_{3.33}(Sn/Si)_{0.33}P_{0.67}S_4$ | 5.9 | 8 | 3.24 |
| Example 11 | 0.55 | 2/8 | $Li_{3.45}(Sn/Si)_{0.45}P_{0.55}S_4$ | 5 | 24.1 | 3.24 |
| Example 12 | 0.69 | 10/0 | $Li_{3.31}Sn_{0.31}P_{0.69}S_4$ | 4.8 | 4.6 | 4.08 |
| Example 13 | 0.76 | 10/0 | $Li_{3.24}Sn_{0.24}P_{0.76}S_4$ | 4.8 | 12.8 | 3.55 |

TABLE 2

| | α | Sn/Si | $Li_{4-\alpha}(Sn/Si)_{1-\alpha}P_\alpha S_4$ | Ion conductivity (mS/cm) | Impurity phase (%) | Half value width (ppm) |
|---|---|---|---|---|---|---|
| Comp. Ex. 1 | 0.75 | 5/5 | $Li_{3.25}(Sn/Si)_{0.25}P_{0.75}S_4$ | 3.8 | 33.6 | 3.27 |
| Comp. Ex. 2 | 0.75 | 2/8 | $Li_{3.25}(Sn/Si)_{0.25}P_{0.75}S_4$ | 3.3 | 45.6 | 3.06 |
| Comp. Ex. 3 | 0.72 | 2/8 | $Li_{3.28}(Sn/Si)_{0.28}P_{0.72}S_4$ | 3 | 54.1 | 3.3 |
| Comp. Ex. 4 | 0.6 | 9/1 | $Li_{3.4}(Sn/Si)_{0.4}P_{0.6}S_4$ | 4 | 4.8 | 4.23 |
| Comp. Ex. 5 | 0.6 | 8/2 | $Li_{3.4}(Sn/Si)_{0.4}P_{0.6}S_4$ | 3.7 | 7.6 | 4.24 |
| Comp. Ex. 6 | 0.55 | 5/5 | $Li_{3.45}(Sn/Si)_{0.45}P_{0.55}S_4$ | 4.7 | 12.5 | 4.03 |
| Comp. Ex. 7 | 0.5 | 5/5 | $Li_{3.5}(Sn/Si)_{0.5}P_{0.5}S_4$ | 4 | 13.3 | 4.1 |
| Comp. Ex. 8 | 0.67 | 2/8 | $Li_{3.33}(Sn/Si)_{0.33}P_{0.67}S_4$ | 4.4 | 37.6 | 3.29 |
| Comp. Ex. 9 | 0.5 | 2/8 | $Li_{3.5}(Sn/Si)_{0.5}P_{0.5}S_4$ | 4.1 | 25.8 | 3.48 |

Figure 4:
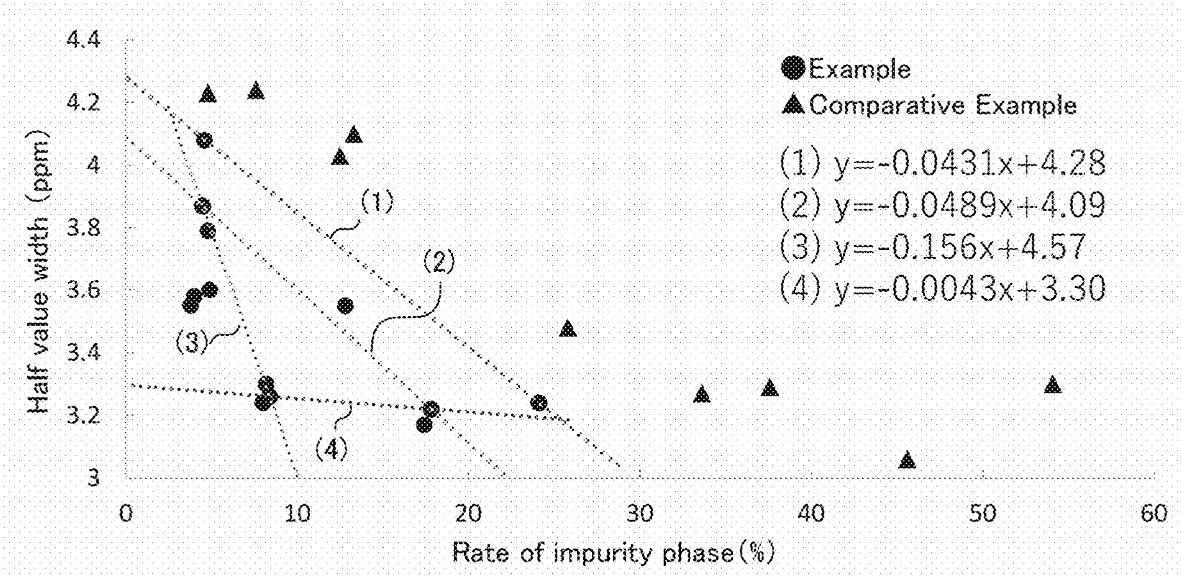
FIG. 4 is a graph showing the relation of the half value width and the rate of impurity phase regarding the sulfide solid electrolytes obtained in Examples 1 to 13 and Comparative Examples 1 to 9.

As shown in Table 1, Table 2 and FIG. 4, from the line (1) connecting the results of Example 11 and Example 13, difference in ion conductivity of the sulfide solid electrolytes was seen. It is considered that the size of the half value width of the peak in the 2b site, that is, the degree of the crystallinity contributed to the stability of the main chain and the stability of the crystal structure. Then, it is considered that excellent ion conductivity was shown even when the rate of impurity phase was large, when the main chain and the crystal phase were stable. Incidentally, although not illustrated, the correlation shown in Table 1, Table 2, and FIG. 4 was not seen among the half value width of the second peak (peak of 4d site), the rate of impurity phase, and the ion conductivity.

REFERENCE SIGNS LIST

1 cathode layer
2 anode layer
3 solid electrolyte layer
4 cathode current collector
5 anode current collector
6 outer package
10 solid state battery

What is claimed is:

1. A sulfide solid electrolyte comprising a LGPS-type crystal phase, wherein:

whether the sulfide solid electrolyte comprises the LGPS-type crystal phase is determined by an X-ray diffraction measurement using a CuKα ray, where measured peaks are present at positions of 2θ=20.18°±0.50°, 20.44°±0.50°, 26.96°±0.50°, and 29.58°±0.50°;

the sulfide solid electrolyte has a composition represented by $Li_{4-\alpha}(Sn_{1-\beta}Si_\beta)_{1-\alpha}P_\alpha S_4$, provided that $0.67 \leq \alpha \leq 0.7$ and $0.5 \leq \beta \leq 0.8$;

in a $^{31}$P-NMR measurement, when y (ppm) designates a half value width of a peak having an apex at a position of 77 ppm±1 ppm, and x (%) designates a rate of impurity phase, the sulfide solid electrolyte satisfies a below formula (1):

$$y \leq -0.0431x + 4.28 \qquad (1);$$

the half value width y (ppm) satisfies $3.24 \leq y \leq 3.58$;

the rate of impurity phase x (%) satisfies $4 \leq x \leq 8$; and an ion conductivity of the sulfide solid electrolyte at 25 °C is 5.8 mS/cm or more.

2. The sulfide solid electrolyte according to claim 1, wherein the sulfide solid electrolyte further satisfies a below formula (2):

$$y \leq -0.0489x + 4.09 \qquad (2).$$

3. The sulfide solid electrolyte according to claim 1, wherein the sulfide solid electrolyte further satisfies a below formula (3):

$$y \leq -0.156x + 4.57 \qquad (3).$$

4. A solid state battery comprising a cathode layer containing a cathode active material, an anode layer containing an anode active material, and a solid electrolyte layer arranged between the cathode layer and the anode layer, wherein:

at least one of the cathode layer, the anode layer, and the solid electrolyte layer contains the sulfide solid electrolyte according to claim 1.

5. The sulfide solid electrolyte according to claim 1, wherein whether the sulfide solid electrolyte comprises the LGPS-type crystal phase is determined by an X-ray diffraction measurement using a CuKα ray, where measured peaks are present at positions of 2θ=20.18°±0.30°, 20.44°±0.30°, 26.96°±0.30°, and 29.58°±0.30°.

6. The sulfide solid electrolyte according to claim 1, wherein whether the sulfide solid electrolyte comprises the LGPS-type crystal phase is determined by an X-ray diffraction measurement using a CuKα ray, where measured peaks are present at positions of 2θ=20.18°±0.10°, 20.44°±0.10°, 26.96°±0.10°, and 29.58°±0.10°.

* * * * *